United States Patent [19]

Hinterwaldner

[11] Patent Number: 4,940,846

[45] Date of Patent: Jul. 10, 1990

[54] HYDROPHOBIC AND/OR ABHESIVE MATERIALS, REACTIVE DILUENTS

[76] Inventor: Rudolf Hinterwaldner, Kastanienstrasse 13, 8000 Munchen 90, Fed. Rep. of Germany

[21] Appl. No.: 302,124

[22] Filed: Jan. 26, 1989

Related U.S. Application Data

[63] Continuation of Ser. No. 1,936, Jan. 9, 1987, abandoned, which is a continuation-in-part of Ser. No. 726,903, Apr. 18, 1985, abandoned.

[30] Foreign Application Priority Data

Aug. 18, 1983 [DE] Fed. Rep. of Germany ....... 3329877
Aug. 17, 1984 [WO] PCT Int'l Appl. ... PCT/DE84/00169

[51] Int. Cl.$^5$ .......................... B05D 3/02; C09K 3/00
[52] U.S. Cl. .................................. 427/385.5; 106/285; 427/386; 427/387; 525/309; 585/12; 585/18; 528/421; 428/446; 428/452; 428/500; 428/507
[58] Field of Search ............................ 585/12; 525/309; 528/421; 427/385.5, 386, 387; 428/446, 452, 500, 507

[56] References Cited

U.S. PATENT DOCUMENTS

| | | |
|---|---|---|
| 2,340,109 | 1/1944 | D'Alello . |
| 2,952,576 | 9/1960 | Wheelock et al. ................ 528/25 |
| 3,249,581 | 5/1966 | Nelson . |
| 3,324,051 | 6/1967 | Lal ................................ 528/421 |
| 3,328,482 | 6/1967 | Northrup et al. ................ 528/25 |
| 3,341,475 | 9/1967 | Vandenberg ................... 528/421 |
| 3,644,315 | 2/1972 | Gardner et al. ................. 585/18 |
| 3,778,487 | 12/1973 | Driscoll et al. ................. 585/18 |
| 3,814,679 | 6/1974 | Erlmeier et al. ................. 585/18 |
| 4,002,583 | 1/1977 | Taylor et al. ................... 106/901 |
| 4,057,658 | 11/1977 | Sigvard et al. ............... 427/385.5 |
| 4,083,856 | 4/1978 | Mendicino .................... 549/215 |
| 4,154,714 | 5/1979 | Hockemeyer et al. ......... 427/387 |
| 4,166,057 | 8/1979 | Takemori ..................... 525/240 |
| 4,250,300 | 2/1981 | Saegusa et al. ............... 528/401 |
| 4,288,463 | 9/1981 | Weber et al. ................. 585/324 |

FOREIGN PATENT DOCUMENTS

1310064 3/1973 United Kingdom .
1347954 2/1974 United Kingdom .

OTHER PUBLICATIONS

Ashikari, "Poly(tetramethylene)", Chemical Abstracts 53:8712d, 1958.
Osokin, "Reactivity of Isohexenes in Dimenization on an Aluminosilicate Catalyst", Chemical Abstracts 73:109061d, 1970.

Primary Examiner—Theodore Morris
Attorney, Agent, or Firm—Wegner & Bretschneider

[57] ABSTRACT

A method of imparting hydrophobic or abhesive properties to a substrate. A composition including a compound selected from the group consisting of
(a) a compound of the formula

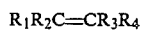

$$R_1R_2C=CR_3R_4$$

and an oligomer of polymer thereof;
(b) a compound of the formula

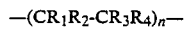

$$-(CR_1R_2\text{-}CR_3R_4)_n-$$

(c) a compound of the formula

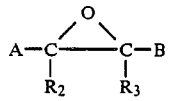

and an oligomer of polymer thereof
wherein $R_1$, $R_2$ and $R_3$ are independently $CH_3$ or $C_2H_5$; $R_4$ is H, $CH_3$ or $C_2H_5$; A and B are independently H, $CH_3$, $C_2H_5$ or $-(CR_1R_2\text{-}CR_3R_4)_n-$; and n is an integer between 1 and 20,000,000 is applied to the surface of the substrate. When the composition cures, the substrate possesses superior water-proof and release properties.

18 Claims, No Drawings

HYDROPHOBIC AND/OR ABHESIVE MATERIALS, REACTIVE DILUENTS

This application is a continuation of U.S. application Ser. No. 001,936, filed Jan. 9, 1987, which is a continuation-in-part of application Ser. No. 726,903, filed Apr. 18, 1985 both abandoned.

BACKGROUND OF THE INVENTION

This invention relates to inorganic, organometallic and organic compositions containing olefins and olefin epoxides rich in methyl side groups, and which exhibit hydrophobic and abhesive properties. These compositions are very economical for use in building materials, coating and impregnation materials, film and foil materials, etc. Preferred are the beta olefins and oxides thereof. The olefins and oxides are rich in methyl side groups and are also useful as reactive diluents, as plasticizers, and for the creation of an oxygen-poor reaction environment.

To impart hydrophobic and/or abhesive properties to materials, surfaces, etc. is of great technical and economical importance. Hydrophobicity protects surfaces from water, and consequently from corrosion. In some applications it is desirable to obtain sufficient hydrophobicity coupled with sufficient porosity to permit "breathing" of the treated materials and substrates. The abhesive properties are required if surface characteristics are desired in which adhesive materials will not adhere too strongly and from which they can easily be removed again without a residue on the abhesive surface. Such abhesive systems have gained considerable importance as release coatings on backings for pressure sensitive adhesive films and foils.

Many compounds to produce hydrophobic and abhesive materials have been described in the literature; they fulfill these functions to a greater or lesser degree, and their effectiveness and efficiency often depend on the material characteristics. According to today's state of the art a number of compounds are used to impart hydrophobicity and sometimes also abhesive properties, such as fatty substances, e.g. paraffins, waxes, metallic soaps; aluminium compounds, e.g. aluminium sulfate, acetate, and formiate; high molecular weight alkyl pyridinium compounds, alkyl isocyanates, substituted ethylene ureas, complex chromium compounds, silicones. To apply these compounds to be treated, they generally have to be dissolved in inert solvents first. These solvents have to be removed by evaporation after application which causes environmental problems or requires expensive recovery equipment. To impart abhesiveness the fatty substances, such as paraffins, waxes and metal soaps, have been generally replaced to day by the very expensive silicone materials since the abhesive properties of the former compounds no longer satisfy the high technical requirements.

The newer hydrophobic and/or abhesive materials based on polyorganosiloxanes have a number of good properties, however, they do not satisfy all requirements. These problems can be related to the following facts. They often have to be applied as solutions in organic solvents. They often require high hardening and polymerization temperatures. Solvent-based systems release the solvent during hardening and drying. These solvent vapors are either released into the atmosphere or they have to be collected in rather expensive recovery equipment. These silicones are several times more expensive than the more conventional products; thus, they often cannot be applied in sufficient amounts to obtain the required hydrophobicity or abhesiveness of the treated substrate for economical reasons.

Thermo-sensitive materials and substrates cannot be treated with the hydrophobicity- and/or abhesiveness-imparting products which have to be hardened and polymerized at higher temperatures. The exposure to heat changes the original shape of the substrate and often even its structure. Materials and substrates which contain some moisture can withstand brief exposure to heat, such as cellulosic materials and paper sheets; however they generally have to be remoistened by exposure to water vapor to regain their original properties, such as planeness and flexibility. This remoistening procedure is not only expensive and energy intensive, its effectiveness is also in doubt by many skilled in this art.

The functionality which causes hydrophobicity and abhesiveness in organosiloxanes is well understood and described in the literature. These properties are not only determined by the nonpolarity of the side chains of the molecule, but are greatly affected by as high a content of nonpolar methyl side groups per molecule unit as possible The content of unpolar methyl side groups actually determines the hydrophobicity and abhesiveness. The functionality which causes hydrophobicity and abhesiveness can easily be shown on the so-called "brush-effect" of a dimethyl polysiloxane compound:

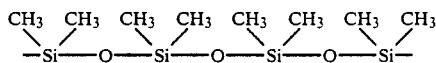

This schematic shows also that because of the basic structure of polydimethylsiloxanes the content of the important methyl side groups is limited to 2 per Si-O unit.

Many attempts have been made to decrease the cost of imparting hydrophobicity and abhesiveness to materials and substrates. This task was generally unsuccessful since it was difficult to increase the content of methyl side groups in existing compounds, and since other compounds richer in methyl side groups were not economically available.

Controlled release, i.e., adjusting the release force over a wide range as desired for different requirements, for release coated paper and foil backings for pressure sensitive release systems has long been a goal of the industry. Obtaining this goal has been frustrated to far by the inability to economically increase the nonpolar methyl side group content in these compounds, and since it was not possible to achieve a statistically uniform distribution of the methyl groups along the backbone of the molecule.

In free-radical polymerization, hardening and cross-linking of unsaturated compounds, such as polyester resins, acrylic and methacrylic resins, the oxygen in the air inhibits curing of the surface. The oxygen destroys the free radicals; thus, the hardening reaction is inhibited and the surface remains sticky. Attempts were made to protect the surface from the oxygen in the air by covering it with foils, glass plates, etc. However, this was technically impractical. It was then suggested to add paraffin to these systems (Ger. Pat. No. PS 948 818). The paraffin floats to the surface during hardening and forms a protective coating against the oxygen. However, this paraffin addition created several problems. The most important problems encountered are:

paraffin crystallizes at lower temperatures from the hardenable materials; at higher temperatures it no longer floats to the surface. It is also well known that paraffin-containing systems will not harden at high temperatures. Thus, with paraffin-containing systems it is not possible to obtain short reaction times using high temperatures since the system can only be heated until the paraffin has floated out completely. The industry has been waiting for improved solutions for a long time because the paraffin-containing hardenable compounds are excellent polishable compounds.

OBJECT OF THE INVENTION

It was the goal of this invention to develop inorganic, organo- metallic and/or organic materials as well as reactive diluents and plasticizers with technically improved hydrophobic and abhesive properties and which are much more economical. Simultaneously, many of the aforementioned problems were to be eliminated.

DESCRIPTION OF THE INVENTION

Specific fractionation cuts during the petrochemical treatment of petroleum contain monomers rich in methyl side groups of the general formula $R_1R_2C=CR_3R_4$ in which $R_1$, $R_2$, $R_3$ and $R_4$ are independently a hydrogen atom, a methyl and an ethyl group, can be recovered.

These systems are mostly composed of mixtures of the following olefin types:

| $R_5R_6C=CR_7R_8$ | $R_5R_6C=CR_7H$ |
|---|---|
| type 1 | type 2 |
| $R_5HC=CR_6H$ | $R_5R_6C=CH_2$ |
| type 3 | type 4 | where $R_{5-8}$ are independently methyl or ethyl groups. The combined content of type 1 and type 2 are at least 40%. The individual olefin types can be obtained economically and of relatively high purity by fractionation and/or distillation processes.

These monomers carry at least 2.0, and preferably 3.0 to 4.0 methyl side groups per molecule. Because of the C—C double bond they can be oligomerized, polymerized, copolymerized, ethoxylated and reacted with many functional groups.

This invention relates to a method of imparting hydrophobic or abhesive properties to a substrate wherein there is applied to said substrate an effective amount of a composition comprising 0.1 to 99.9% by weight of a compound selected from the group consisting of
(a) a compound of the formula $R_1R_2C=CR_3R_4$ and an oligomer of polymer thereof;
(b) a compound of the formula $-(CR_1R_2-CR_3R_4)_n-$ (c) a compound of the formula

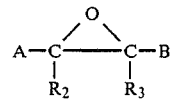

and an oligomer or polymer thereof
wherein $R_1$, $R_2$ and $R_3$ are independently $CH_3$ or $C_2H_5$; $R_4$ is independently H, $CH_3$ or $C_2H_5$; A and B are independently H, $CH_3$, $C_2H_5$ or $-(CR_1R_2-CR_3R_4)_n-$; and n is an integer between 1 and 20,000,000.

Beta olefin monomers rich in methyl side groups according to formula (a) are compounds with one unsaturated beta C—C double bond and a methyl side group content of at least 3.0, and preferably 4.0 per molecular unit. Representative of this group are 2-methylbutene-2, 2,3-dimethylbutene-2 and 2,3-dimethylpentene-2.

Dimerization, oligomerization or polymerization, according to known processes, of these olefin monomers by themselves or in mixture results in liquid to solid products of differing molecular weights, however, with a definable content of nonpolar methyl side groups. The solid homopolymeric olefin polymers have wax-like properties with melting points, depending on degree of polymerization, of between 40° and 250° C. and molecular weights up to 20,000,000, preferably 50 to 1,000,000, especially 50 to 50,000.

Beta olefin polymers rich in methyl side groups and their derivatives according to formula (b) of this invention are alkenes, cycloalkenes, aryl alkenes, straight chain and cyclic polyenes. They are produced by known processes by dimerization, mixed dimerization, oligomerization, mixed oligomerization, polymerization, copolymerization, polycondensation or polyaddition of the methyl side group-rich beta olefin monomers or compounds of formula (a) or (c). The dimerization, oligomerization or polymerization of such compounds are well described in the literature (e.g., Houben-Weyl, volumes V/1a and 1b, 1972). No claim is made to these within the framework of this invention. The oligomerization and mixed oligomerization can be carried out, e.g., with cationic and anionic catalysts, coordination catalysts, and also thermally or via photochemistry.

The dimers, oligomers and polymers according to formula (a) of this invention are preferred beta olefins having at least one C—C double bond. Typical representatives of these dimers and oligomers are:

2,4,4-trimethylpentene-2;
2,2,4,6,6-2,2,4,6,6-pentamethylheptene-2;
2,3,4,4,5,5,6,6,7,7,8,8,9,9,10-10,11-heptadecanmethyldodecene-2
2,4,4,6,6,8,8-heptamethylnonene-2;
2,2,4,4,6,6,8,8,10-nonamethylundecene-2;
2,3,4,5,5,6,7-octamethyloctadiene-2,7.

The oligomeric beta olefins of this invention can also be mixtures or mixed oligomers. They generally have a carbon number between 10 and 50; their flash point is above 100° C., especially between 105° and 250° C.

They carry 3.0, preferably 4.0 methyl groups per monomeric olefin type according to formula (a). A typical representative of this group is the following having these chemical and physical characteristics:

| Olefin Types: | 2,3-dimethylbutene-2 | 30–40% |
|---|---|---|
| | 3-methylbutene-2 | 40–50% |

|  |  |  |
|---|---|---|
|  | butene-2 | 10–20% |
|  | 2-methylpropene-1 | 1–10% |
| C-Number: | C$_{14}$–C$_{20}$ |  |
|  | Methyl Side Groups: | 3.5 to 4 methyl groups per monomer unit |
| Boiling Range (DIN 51751) | 255° C. boiling starts |  |
|  | 259° C. 10% |  |
|  | 263° C. 50% |  |
|  | 264° C. 70% |  |
|  | 268° C. 90% |  |
|  | 270° C. 95% |  |
|  | 279° C. boiling ends |  |

The viscosity at 50° C. is about 3.5 mm$^2$/S, and the flash point is above 110° C. This compounds contains at least one C—C double bond.

Co-monomers include all those compounds—regardless of their molecular weight—which are polymerizable.

The monomeric olefin types of this invention can be dimerized, oligomerized and polymerized to different degrees of polymerization with other co-monomers. Preparation of the dimers, oligomers and/or polymeric homo- and/or copolymers is carried out according to known and suitable polymerization, polycondensation and/or polyaddition processes. The same applies to the conversion of these compounds with functional groups, such as by addition reactions, which are extensively described in the literature (e.g., Houben-Weyl, volume V/1b, 1972). The dimerization, oligomerization and polymerization of olefin types of formula (a) of this invention with other copolymers can be carried out in such a way that at least one, preferably two or more C—C double bonds are contained in each molecule. This is also important for the number of possibly desired epoxy groups to be introduced per molecule. No claim for these processes is made within the framework of this invention.

Of general technical and economic interest according to this invention are also those dimers, oligomers and/or polymers which contain at least one or more of the beta and epoxy olefins of this invention. Such compositions allow control over the reactivity and economy of these compounds as well as over their hydrophobic, abhesive and plasticizing properties.

The epoxydized monomers, oligomers and polymers of this invention are of particular interest. Introduction of at least one epoxide group into the beta olefins of this invention allows reaction with compounds which carry active hydrogen atoms, such as amines, imines, amides, mono- and polybasic acids and their anhydrides.

Of central importance here are not only the well-known hardening and crosslinking reactions with epoxides, but also the introduction of other unsaturated groups, such as C—C double bonds. Of great importance is the introduction of acrylic and methacrylic groups which leads to new derivatives which exhibit excellent reactivity during free radical polymerizations initiated, e.g., by peroxides, irradiation, etc.

Epoxidation of the beta olefins of this invention and their derivatives according to formula (a) can be accomplished by oxidation with peracids, such as per-benzoic acid, hydrogen peroxide, tertiary butylhydroperoxide, etc. (see a.o. Houben-Weyl volume VI/3, 1965). Examples of epoxides according to this invention are:

2,3-epoxy-2,3-dimethylbutane;
5,6-epoxy-2,2,5-trimethylhexane;
2,3;4,5-diepoxy-2,3,4,5-tetramethylhexane;
1,2;5,6-diepoxy-6-methylheptane;
5,6-epoxy-2,2,5-trimethylhexane;
3,4-epoxy-2,3,4-trimethylpentanal;
2,3,4,5,6,7-hexamethyloctene;
2,3;6,7,-diepoxy-2,3,4,4,5,5,6,7-octamethyloctane.

A further goal of this invention is the utilization of the beta olefins and olefin epoxides of this invention as diluents, solvents and plasticizers in inorganic, organometallic and organic materials. Of particular interest here are the reactive types of olefins alone or in combination with other reactive diluents and solvents such as unsaturated polyester resins, acrylic and methacrylic compounds, etc. Surprisingly, it was found also that the olefins are very compatible with many polyorganosiloxanes and they function as reactive diluents as well as reactive plasticizers. When the beta olefin epoxides are combined with unsaturated compounds, such as unsaturated polyesters, acrylic and methacrylic compounds, etc., which crosslink and harden via free-radical mechanism, these beta olefins and olefin epoxides will form an inert protective layer on the surface which reduces or prevents inhibition of the reaction by oxygen from the air. Simultaneously, these reactive beta olefins and olefin epoxides are chemically bonded into the matrix of the end product. The liquid monomers, oligomers and polymers of this type do not crystallize and thus, contrary to the paraffin additives, do not create any problems on aging and storage. Also, during hardening of such systems at elevated temperatures, the methyl group-rich beta olefins and olefin epoxides of this invention will orient quickly along the surface to form an inert protective layer.

The oligomers and polymers to be used may be chemically inert or they may contain reactive functional groups. Which type of these compounds is applied in specific applications depends on the composition of the formulation, the processing conditions, and the additionally required end properties of the applied product. In a reactive hardenable system such compounds of this invention will preferably be used which carry functional groups which allow these compounds to be chemically bound into the matrix of the applied system. In such materials which harden physically, it is preferred to use nonreactive compounds to prevent additional points of attack by environmental factors against the end product.

The hydrophobic or abhesive systems of this invention can be based upon inorganic, organometallic and organic materials. They can be liquid, pasty, thixotropic, semi-solid and/or solid systems.

The organometallic and organic comonomers useful in this invention include all those compounds which are capable of copolymerization, polycondensation and/or polyaddition with the beta and epoxy olefins rich in methyl side groups. This also includes graft polymerization The poly-condensation reactions must be based on allylic rearrangement reaction The comonomers useful in free-radical, ionic, coordinative, radiation, and photochemically catalyzed polymerization with the beta and epoxy olefins rich in methyl side groups are unsaturated compounds. Included here are monomeric, oligomeric, polymeric and copolymeric compounds having at least one reactive C—C double bond or C—C triple bond in the molecule, as long as they will react with the above-defined beta olefins and olefin epoxides These comonomers include such compounds as straight chain, branched and substituted alkenes, cycloalkenes, arylalkenes, polyenes and cyclic polyenes, allenes, cumulenes and arenes having 2 to 50 carbon atoms, preferably 2 to 20 carbon atoms Aryl herein means aromatic hydrocarbon moieties such as phenyl, naphthyl, biphenyl, anthracyl, phenanthryl, acenapthyl and indenyl as well as aromatic heterocyclics such as pyridinyl, quinolinyl and indolyl. Polyenes and cyclic polyenes have up to 25 double bonds per molecule and include the diphenyl polyenes, carotenes, 1,4 pentadiene, 1,3 butadiene, 1,3 cyclohexadiene, cyclonona-1,3,5 triene, cyclodeca-1,3,5 triene and dicyclopentadiene. The substitution groups include functional groups such as hydroxyl, carboxyl, halogen, nitrile, cyanate, amine, amide, imine, imide, sulfonyl, aldehyde, ester, ketone, ketene, urethane, epoxide groups, and the like. The compounds may carry one or several unsaturated groups. Representatives of these compounds are monomers, oligomers and polymers obtained from ethylene, propylene, butylene, isoprene, isobutylene, butadiene, butene-(2)-diol-(1,4), ethine, 3-pentene-1-ine; vinylacetate, vinyl laurate, crotonaldehyde, vinyl halogen, vinylidene halogen, styrene, alpha-methylstyrene, acenaphthene, acrylic and methacrylic acids and their esters, acid amides; siloxanes, urethanes and epoxides carrying vinyl, acrylic, methacrylic and/or allylic groups; mono- and or poly-unsaturated mono-, di- and poly-carboxylic acids and their anhydrides and esters, such as triallyltrimellitate; unsaturated polyester resins as, e.g, from maleic acid and/or phthalic acid with saturated and unsaturated glycols.

Polymerization of the beta and epoxy olefins rich in methyl side groups by themselves or with suitable co-monomers may be carried out in solvent-free systems, in solutions, or in heterogeneous systems such as emulsion, grain, suspension and/or precipitation polymerization.

For graft reactions and crosslinkings with the olefins high in methyl side groups all natural or synthetic polymers or copolymers may be used containing —CH$_2$— and/or

groups which crosslink and/or are capable of graft reactions by radical formation, and all mixtures thereof. Compounds of this type include high- and low-pressure polyethylene of low and high density, chlorinated and chloro-sulfonated polyethylene, polypropylene, polyvinyl chloride, polyvinyl acetate, polyacrylic acid ester, ethylene-vinylacetate copolymers, ethylene-propylene-copolymers, vinyl-chloride-vinylidenechloride copolymers, ethylene-propylene-butylene copolymers, vinyl-chloride-vinylacetate copolymers, polyisoprene (natural rubber), polybutadiene, polychloroprene, synthetic polyisoprene, ethylene-propylene-ethylidene norbornene, butadiene-styrene copolymers, butadieneacrylonitrile copolymers, butadiene-styrene-acrylonitrile copolymers, styrene-isoprene block polymers, butyl rubber, silicone rubber, saturated polyesters, polyamides, polyurethanes, polyethers, polyacetates, etc.

The comonomers useful for polycondensation and polyaddition reactions with the olefins comprise all organometallic and organic compounds capable of such reactions. These comonomers capable of polycondensation carry hydroxyl, halogen and similar reactive groups. Included here are mono-hydric and poly-hydric alcohols, such as glycol, glycerol, trimethylolpropane, pentaerythritol; mono-, di- and poly-carboxylic acids and their anhydrides, such as abietic acid, phthalic acid, trimellitic acid; aliphatic and aromatic methylol compounds, such as methylol phenol and urea. For polyaddition reactions particularly those organometallic and organic compounds are useful which carry reactive hydrogen atoms. Included here are primary or secondary amines and amides, aliphatic and aromatic isocyanates, saturated and unsaturated mono- or poly-basic carboxylic acids and their anhydrides, aliphatic and aromatic aldehydes, etc. Examples of primary and secondary amines are $C_{1-10}$-alkylamines and $C_{1-10}$-alkenylamines such as methylamine, cyclobutylmethylamine, and allylamine, arylamines such as aniline, aralkylamines such as benzylamine, ethylenimine, azetidine, pyrrolidine, pyrrole, and piperidine. Examples of primary and secondary amides are acetamide, formamide, beta-phenyl-propionamide, n-butyramide, n-valeramide, stearamide and benzamide. Examples of aliphatic and aromatic isocyanates are phenyl isocyanate, methyl isocyanate and butyl isocyanate. Examples of aliphatic and aromatic aldehydes are formaldehyde, phenylacetaldehyde, cyclobutanecarboxaldehyde, benzaldehyde, isobutyraldehyde, and beta-naphthaldehyde. Examples of mono- or poly-basic carboxylic acids are $C_{1-10}$-acids such as acetic acid, lauric acid, toluic acid, benzoic acid, cyclohexanecarboxylic acid, phenylacetic acid, phthalic acid, oxalic acid, succinic acid and adipic acid. The polyaddition reactions of the olefin types of formula (a) and (b) are different from those compounds of formula (c). With compounds of the type of formula (a) and (b), the addition follows the Markownikoff rule or, during radical addition reaction mechanisms under the influence of radiation or catalysts, such as peroxides, an anti-Markownikoff addition takes places. With the epoxides of the type (c) addition the addition takes place on the epoxide group.

Epoxidation of the beta olefins of formula (a) or (b) can be carried out by oxidation with peracids, such as per-benzoic acid, and also with hydrogen peroxide, tertiary butylhydroperoxide, etc.

Organometallic compounds of silicon are of particular interest in combination with the beta olefins and olefin epoxides.

Addition reactions can be carried out with those compounds which contain Si-H-groups. Included here are reactions which proceed via a radical mechanism, such as those catalyzed by peroxides or irradiation, or those reactions which proceed via radical-/"ionic" mechanism, as well as reactions catalyzed by noble metals which usually do not proceed via free-radical mechanism. They can also be reached with organo-silicon compounds carrying vinyl and acrylic groups. Surprisingly, it was also found that condensation and crosslinking reactions can be carried out between the olefins and organo-silicon compounds.

Useful organo-silicon compounds are unbranched, branched and/or cyclic silanes, silanols, polysilanes, polyorganosiloxanes, polysilazanes, polysilathianes, polysilalkenyls, polysilarylenes, polysilalkenesiloxanes, polysilarylenesiloxanes, polysilalkylene- silanes, polysilarylenesilanes carrying at least one silicon- and/or organo-functional group, wherein those preferred are

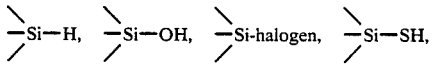

—CH=CH$_2$ and —O—CO—CR=CH$_2$, and wherein halogen is chlorine, bromine, iodine or fluorine, and R is H or an alkyl radical of 1 to 4 C-atoms. The beta olefins and olefin epoxides can be used as reactive diluents, solvents, and plasticizers for viscous organo-silicon compounds without affecting their good hydrophobic and abhesive properties. Depending upon the initial viscosity of the organo-silicon compound, its functional groups, and the required viscosity for application, the ratio of organo-silicon compound to the beta olefins and olefin epoxides and their derivatives of this invention can vary between 99:1 and 1:99, whereby they not only act as co-reactants but also as plasticizers and/or diluents.

To copolymerize the beta olefins and olefin epoxides with various compounds, the known reaction initiators for the specific polymerization, polycondensation, polyaddition, vulcanization and graft polymerization systems are used, which generally include all reactive compounds capable of initiating reactions. Besides the copolymers this includes catalysts such as metal complexes, initiators and radical formers such as peroxides, hydroperoxides, per-acids and their derivatives and salts; oxidants such as lead oxide, manganese dioxide; hardeners such as polyamines, polyamidoamines; isocyanates and their derivatives; mercaptans and mercapto compounds. Reaction accelerators, such as those which easily lose an electron and thus, e.g., increase the rate of decomposition of a peroxide, are also included here. These include heavy metal compounds, amines, amides, imines, imides, mercaptans, azo compounds, etc.

These reactions can also be carried out photochemically via photo-initiators and UV irradiation; via ionized beams such as gamma-rays, x-rays, electron and ion beams; IR-beams and/or emitted IR-beams The materials of this invention can be modified with additives. Useful additives are plasticizers, oils, tars, asphalts, bituminous products, solvents, dyes, pigments, thixotropes, inorganic or organic fillers and fibers, wetting and leveling agents, etc. Stabilizers and/or inhibitors can also be added.

Processing and application of the hydrophobic or abhesive beta and epoxy olefin compounds, diluents and plasticizers depend upon the consistency of these systems. They can also be adapted and adjusted to different application technologies as well as to the physical, chemical and performance requirements of the cured/hardened finished products by varying composition, reactivity, rheology, etc.

Special processing and application conditions are required for those compounds, diluents and plasticizers which are in solid form. They may be used and applied in the form of solutions, dispersions and/or suspensions in inert solvents including water, or they may be applied from their melt. Polymers of this invention which are melt applied can be processed by known processes such as spraying, pressing, pouring, calendering and/or extruding. These technologies allow the production of shaped articles, films, foils, profiles, tubes, etc.

A further goal of this invention is the application of the hydrophobic and abhesive compositions in many industrial, trade and home uses.

New coatings, lacquers, paints, impregnation and parting agents with improved hydrophobic and/or abhesive properties can be produced with the beta olefins and olefin epoxides. Modification of existing systems and materials with the compounds and materials of this invention can also be produced with considerably improved hydrophobic and/or abhesive properties. Another great advantage of the beta olefins and olefin epoxides is their economy and compatibility with the environment.

When used only as reactive diluents and plasticizers in reactive one- or poly-pot systems, the beta olefins and olefin epoxides offer special advantages because of their higher boiling points and flash points while simultaneously they offer better economy and compatibility with the environment. They can be used in a multitude of existing coatings, lacquers, paints, impregnation and parting materials to replace the inert or reactive, flammable or nonflammable solvents in use today to improve their economy, compatibility with the environment with simultaneous improvement in their hydrophobic and abhesive properties.

The beta olefins and olefin epoxides are particularly useful in polydimethylsiloxane systems which crosslink and harden via addition and condensation reactions and which are used extensively in many areas to impart hydrophobicity and to act as parting agents. Many of these silicone systems have to be used and applied in the form of solutions in inert benzene, toluene, xylene, chlorinated hydrocarbons, etc. The compounds of this invention can replace these solvents partially or completely.

The compounds of this invention can also be used as reactive plasticizers in polysiloxane systems. Surprisingly, it was found that polysilicone-based or -containing sealants containing the compounds of this invention exhibit improved paintability.

The beta olefins and olefin epoxides, when used as reactive diluents and plasticizers of this invention are reactively bound into the matrix of the above systems. They improve the hydrophobic and abhesive properties of these systems because of the high methyl group content per monomer unit of the compositions of this invention.

The compounds of this invention exhibit particularly useful properties when incorporated into release coatings and parting agents on paper and plastic films and foils, textiles, fibers, etc. As reactive components in the addition and condensation crosslinking polydimethylsiloxane systems used in these applications, the beta olefins and olefin epoxides will not only act as diluents and solvents but, by adjustment of the methyl group content of the compounds of this invention, it is possible to adjust and control the abhesive properties of these coatings, as measured by the release forces towards sticky materials, such as pressure sensitive adhesives. Since the beta olefins and olefin epoxides contribute many nonpolar methyl groups it is possible to substitute large parts of the polydimethylsiloxane by these compounds to obtain systems with improved abhesive properties. Elimination of the inert solvents and replacement by the reactive beta olefins and olefin epoxides not only improves the economy and compatibility with the environment, but it makes it possible to crosslink, cure and harden at lower temperature, even below 100° C. This also makes it possible to coat temperature-sensitive plastic foils and films with the abhesive materials of this invention.

The beta olefins and olefin epoxides are very useful in combination with unsaturated compounds such as unsaturated polyester resins, acrylic, methacrylic and allylic compounds, which harden and crosslink via free-radical and irradiation induced mechanisms. At a sufficiently high methyl side group content they will form a protective barrier towards oxygen in the air. This suppresses the inhibition of the crosslinking and hardening reaction by oxygen and a non-sticky surface is obtained. This effect may be accomplished by the addition of 10% or less based on the content of reactive material in the system. They are also built into the hardened and crosslinked matrix This performance is of particular interest in radiation-curable systems since it eliminates the need for a protective gas atmosphere during hardening and crosslinking and it eliminates the need to incorporate synergists.

Another specific application of this invention is the production of films and foils with specific hydrophobic and abhesive properties from the polymeric beta olefin and olefin epoxide compounds. Such hydrophobic, abhesive and soil-rejecting foils and films are useful in the construction industry as abhesive release films and foils for packaging and covering sticky materials, and as substrates such as pressure sensitive adhesives, pressure sensitive adhesive films and tapes. Besides improved properties, they offer better economy and compatibility with the environment.

The beta olefins and olefin epoxides can also be used for the impregnation of natural products such as cellulose fibers, wood chips and shavings, etc , to impart hydrophobicity. Thus, it was surprisingly found that wood chips for the production of particle boards can be made hydrophobic by treatment with these compounds. Saturated isoparaffins do not accomplish this (see ADHAESION, volume 4, 1983). This suggests that the beta olefins and olefin epoxides coreact with the polycondensation and/or polyaddition adhesives and glues used in this application Additionally, the beta olefins and olefin epoxides of this invention possess foam regulation properties. Therefore, they are suitable for use as curing accelerators in polyurethane foams.

There are many additional application and use possibilities in industry, the crafts, and the home for the hydrophobic and abhesive beta olefins and olefin epoxides too numerous to be fully enumerated here.

In summary, this invention not only provides new and improved hydrophobic or abhesive compounds, diluents and plasticizers and foam regulators as curing accelerators or inhibitors which eliminate the aforedescribed and other disadvantages of existing systems, they also offer additional application, use and performance advantages which have been sought for a long time Some of these advantages provided by beta olefins and olefin epoxides are:

New hydrophobic and/or abhesive compositions.
Improvement of the hydrophobic and/or abhesive properties of existing materials by incorporation of the beta olefins and olefin epoxides.
Replacement of existing hydrophobic and/or abhesive materials by the compositions.
Replacement of conventional reactive, inert diluents and plasticizers by one or more liquid beta olefins and olefin epoxides.
Reduction and/or elimination of physiological and toxicological problems as well as environmental problems by the substitution and replacement of presently used hazardous materials by the beta olefins and olefin epoxides.
Greater economy.

The amounts and ratios used in the following non-limiting examples are shown in weight and weight ratio.

EXAMPLES

The following monomers, oligomers and polymers were used in these examples:
Monomer 1: 2,3-dimethylbutene-2
Monomer 2: 2,3-epoxy-2,3-dimethylbutane

---

Oligomer 1: Oligomer mixture of 2,3-dimethylbutene-2 (40%), 3-methylbutene-2 (45%), butene-2 (15%), and 2-methyl-propene-1 (5%).

| | |
|---|---|
| C-Number: | $C_{14}$–$C_{20}$ |
| Side Chains: | 3.4 to 4.0 methyl groups per monomer unit |
| Density in g/ml: | 0.817 |
| Viscosity/50° C.: | 3.5 mm$^2$/S |
| Flash Point: | 112° C. |
| Boiling Range: | 255° C. beginning 280° C. ending |
| Double Bonds: | 2 |

Polymer 1: Low molecular weight polymer produced from Oligomer 1

| | |
|---|---|
| C-Number: | 80% $C_{60}$–$C_{65}$ 20% $C_{30}$ |
| Side Chains: | 2.0 methyl groups per monomer unit |
| Viscosity: | 2050 mPa.s |
| Density/15° C.: | 0.892 |
| Flash Point: | 203° C. |
| Double Bonds: | 1 |

EXAMPLES 1 AND 2

The following free-radical-hardening coating materials were produced:

| | Example | | Comparison |
|---|---|---|---|
| | 1 | 2 | |
| Bisphenol-A-dimethacrylate | 70 | 70 | 70 |
| Oligomer 1 (diluent) | 30 | 5 | — |
| Methylmethacrylate (diluent) | — | 25 | 30 |
| N,N-diethylanilin | 1 | 1 | 1 |
| Benzoyl peroxide (50% in plasticizer) | 4 | 4 | 4 |

The benzoyl peroxide was mixed into the blend of reactants. Sandblasted steel sheets were coated with the 3 final mixtures to a thickness of about 100 microns. All 3 coatings gelled within 10 minutes and were completely hardened after another 20 minutes. The coatings of examples 1 and 2 were non-sticky and easily polishable. The surface of the comparison system remained sticky which is an indication that the complete reaction on the surface was inhibited by the oxygen from the air.

EXAMPLE 3

100 g of 2,3-epoxy-2,3-dimethylbutane were reacted with 86 g of acrylic acid to obtain the acrylic-acid-2-hydroxy-1,1,2-trimethylpropylene-ester. Three (3) moles of this ester were mixed with one (1) mole of pentaerythrite-acrylate. This mixture was applied to a sandblasted sheet of steel and cured by an electron beam of 3 Mrd. The coating film was completely hardened through and the surface was not sticky.

EXAMPLE 4

A trowellable mass was prepared by adding 3% of polymer 1 to a highly reactive, unsaturated polyester (viscosity about 1000 cp, styrene content about 35%).* For comparison, the same polyester was mixed with 5% paraffin instead of polymer 1. After addition of 4 wt.-% benzoyl peroxide (50% in plasticizer) both mixtures hardened completely within 10 minutes. While the material containing the paraffin remained sticky on the surface, the system containing the polymer of this invention was non-sticky. Both systems were subsequently stored for 4 weeks in completely de-ionized water. The system containing polymer 1 showed no change while the system with the paraffin addition had turned dull and showed cracks in the surface.

EXAMPLES 5 AND 6

The following condensation-curing silicone release materials were prepared and coatings applied:

|  | Example 5 | Example 6 | Comparison |
| --- | --- | --- | --- |
| alpha, w-dihydroxy-polydimethylsiloxane | 10 | 5 |  |
| Oligomer 1 (reactive diluent) | 90 | 95 | 10 |
| Toluene (inert diluent) | — | — | 90 |
| Methyldiethoxysilane (crosslinker) | 10 | 10 | 10 |
| Dibutyl-tin-dilaurate (catalyst) | 5 | 5 | 5 |
| Viscosity/20° C., mPa.s | 400 | 250 | 500 |
| Substrate: satinated paper, 67 g/m² |  |  |  |
| coating weight(wet) g/m² | 2-3 | 2-3 | 40 |
| coating weight(dry) g/m² | 2-3 | 2-3 | 2 |
| Hardening time at 80° C./sec. | 20 | 20 | none |
| at 120° C./sec. | 5 | 5 | 15 |
| Release force** (FINAT 10)mN/cm | 80 | 87 | 80 |
| Subsequent adhesion (FINAT 11)% | 97 | 90 | 95 |

*A highly reactive unsaturated polyester resin composed of 35 wt. % phthalic anhydride, 25 wt. % maleic anhydride, 26 wt. % di-ethylene glycol, 15 wt. % ethylene glycol, and pre-accelerated with amine.
**testing adhesive tape = acrylic adhesive These examples show that with the addition of beta or epoxy olefins, such as oligomer 1, compared with the pure silicone systems, the hardening times are shorter, the reactive diluent is fully built into the hardened matrix, and that analogous release force and subsequent adhesion values are obtained. With the pure silicone release systems (comparison test) the inert diluent has to be evaporated, the hardening times are longer, and the curing temperatures are higher.

EXAMPLES 7 AND 8

The following addition-curing silicon release materials were prepared and coatings applied:

|  | Example 7 | Example 8 | Comparison |
| --- | --- | --- | --- |
| Vinylpolydimethylpolysiloxane Viscosity 5.000 mPa.s | 50 | 70 | 100 |
| Oligomer 1 (reactive diluent) | 50 | 30 | — |
| Crosslinker | 3 | 3 | 3 |
| Catalyst | 0.4 | 0.4 | 0.4 |
| Viscosity/20° C., mPa.s | 300 | 400 | 500 |

|  | Example 7 | Example 8 | Comparison |
| --- | --- | --- | --- |
| Substrate: satinated paper, 67 g/m² |  |  |  |
| coating weight g/m² | 2-3 | 2-3 | 2-3 |
| Hardening time/100° C./sec. | 30 | 30 | 60 |
| Hardening time/120° C./sec. | 8 | 8 | 15 |
| Release force (FINAT 10)mN/cm | 85 | 87 | 87 |
| Subsequent Adhesion (FINAT 11)% | 94 | 95 | 95 |

These examples show that by the addition of the beta and epoxy olefins as reactive diluents, the content of polysiloxanes in the formula can be reduced with constant end properties.

EXAMPLE 9

The following materials for the impregnation of textiles were made:

|  | Example 9 | Comparison |
| --- | --- | --- |
| Hydroxyl-modified methylhydrogenpolysiloxane | 5 | 5 |
| Oligomer 1 | 95 | — |
| Methylene chloride | — | 95 |
| Dibutyl-tin-dilaurate, 10% (hardener) | 20 | 20 |

These impregnation materials were used to treat linen fabrics. In the case of the comparison system the solvent methylene chloride had to be evaporated. Both treated fabrics were then sprayed with water and subsequently suspended vertically. While in the case of the comparison the water droplets remained spread on the surface, they pearled up in the case of composition of example 9.

EXAMPLE 10

A methylhydrogenpolysiloxane with a viscosity of 150 to 300 mm²/sec at 25° C. and an average molecular weight of 2,500 was selected as a protective treatment material for building materials. The methylhydrogenpolysiloxane was dissolved in Oligomer 1 and for comparison in Test Benzine S and diluted to application concentrations.

|  | Example 10 | | | Comparison | | |
| --- | --- | --- | --- | --- | --- | --- |
|  | a | b | c | a | b | c |
| Polydimethylsiloxane | 3 | 5 | 10 | 5 | 10 | 12 |
| Oligomer 1 (reactive diluent) | 97 | 95 | 90 | — | — | — |
| Test Benzine S | — | — | — | 95 | 90 | 88 |
| Catalyst (dibutyl-tin-diacetate) | 2 | 2 | 2 | 2 | 2 | 2 |

Concrete blocks (Bn 150) were impregnated to saturation with these materials. The impregnated blocks were weighed before and after storage in water for 4 weeks. The water absorption was:

| (a) Example 10 (invention) | (a) 0.20% of the dry weight |
| --- | --- |
|  | (b) 0.15% of the dry weight |
|  | (c) 0.11% of the dry weight |
| (b) Comparison | (a) 0.90% of the dry weight |
|  | (b) 0.50% of the dry weight |
|  | (c) 0.30% of the dry weight |

Water absorption of the untreated blocks was about 12% of the dry weight. The reactive diluent Oligomer 1 partially reacts with the methylhydrogenpolydimethylsiloxane; therefore, the hydrophobicity properties are improved using reduced amounts of the treatment material, and no environmentally incriminating solvents will evaporate as compared to the comparison system using Test Benzine S.

EXAMPLE 11

The following organic polysiloxane materials were prepared which are storage-stable under the exclusion of moisture:

|  | Example 11 | | | Comparison | | |
| --- | --- | --- | --- | --- | --- | --- |
|  | a | b | c | a | b | c |
| alpha, w-dihydroxypolydimethyl siloxane | 50 | 70 | 90 | 50 | 70 | 90 |
| Oligomer 1 | 50 | 30 | 10 | — | — | — |
| Silicone oil (polydimethyl-siloxane) | — | — | — | 50 | 30 | 10 |
| Calcium carbonate | 20 | 20 | 20 | 20 | 20 | 20 |
| Finely divided silica (BET 150 m²/g) | 5 | 5 | 5 | 5 | 5 | 5 |
| Titanium dioxide | 1 | 1 | 1 | 1 | 1 | 1 |
| Dibutyl-tin-diacetate | 0.8 | 0.8 | 0.8 | 0.7 | 0.7 | 0.7 |
| Di-N-methylbenzamido-methyl-ethoxy-silane | 5.0 | 5.0 | 5.0 | 5.0 | 5.0 | 5.0 |

These systems were produced according to known procedures in a crutcher and degassed in vacuo. These materials were applied to steel plates at a thickness of 3 mm and cured for 3 days at normal conditions. Following this they were coated with an alkyd resin paint (pre- and to-coat). Adhesion (according to Boeing test as described in ASTM D 3359-70) was good for the addition of Oligomer 1 whereas the comparison system showed no adhesion.

EXAMPLE 12

10 pbw of a silicone-acrylate* (viscosity 2,000 mPa.s/25° C. were diluted with 50 pbw of acrylic-acid-2-hydroxy-1,1,2-trimethyl-polyester (example 3) and 10 pbw of acrylamide. This mixture was divided, applied to substrates, and cured by EB and UV rays. To these radiation curable materials the following synergists were added: 5% diethoxy-acetophenone, 2% benzophenone, and 2% of an amine-synergist. The following substrates were coated:

| Substrates | Application Thickness microns | EB-Dosage Mrd | UV-Hardening Lamp 80 W/cm seconds |
| --- | --- | --- | --- |
| Paper, 67 g/m² | 2 | 3 | 5 |
| Soft PVC-Foil, 100 microns | 1 | 2 | — |
| OPP-Foil, 40 microns | 1 | 1 | — |
| Steel Plate, sandblasted | 30 | 5 | 15 |

*The silicone-acrylate is a hexa-functional silicon compound of the following formula:

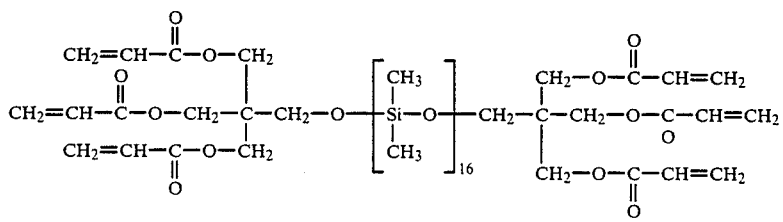

and additionally contains a hydrogensiloxane crosslinker of the formula:

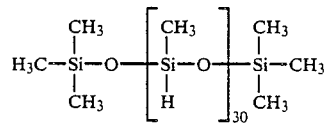

All these hardened and cured coatings exhibited good hydrophobic and abhesive properties. The values were equal or better than those for pure silicone-acrylates.

EXAMPLE 13a 95 parts by weight of a bisphenol A epoxide with an average epoxide value of 0.55 and a viscosity of ca. 15,000 mPa.s at 25° C. were diluted with 5 parts by weight of 2,3-epoxy-2,3-dimethylbutane. The resulting mixture had an epoxide value of 0.57 and a viscosity of ca. 12,500 mPa.2 at 25° C. 35 parts by weight of a cycloaliphatic diamine (LAROMIN ®C), H-active equivalent weight 60, were added to and homogeneously mixed with the 100 parts by weight of epoxide-resin mixture. This finished coating agent had a pot life of 40 minutes and cured through completely within 24 hours. Concrete of quality class Bn 150 was impregnated with this coating material. In comparison with the coating material without 2,3-epoxy-2,3-dimethylbutane, the penetration of the epoxide-resin mixture of the invention into the concrete surface was ca. 30% greater. In addition, the hydrophobic properties at the surface were improved.

EXAMPLE 13b 50 parts by weight of the epoxide resin according to Example 13a were diluted with 50 parts by weight of 2,3-epoxy-2,3-dimethylbutane. The resulting impregnating agent had an epoxide value of 0.77 and a viscosity of ca. 3,500 mPa.2 at 25° C. After addition of 50 parts by weight of a cycloaliphatic diamine, H-active equivalent weight 60, this mixture was used as a deep impregnating agent for concrete A concrete block (20×10×5 cm) of quality class Bn 250 was impregnated therewith. The impregnating agent penetrated ca. 1.5 cm into the concrete surface. After 48-hour curing of the impregnating agent at ca. 22° C., the impregnated concrete block was stored for 30 days in water at 20° C. The water absorption in this period was only 1.8 weight percent relative to the dry sample of building material

EXAMPLE 14

To 80 parts by weight of 3,4-epoxycyclohexylmethyl-3,4-epoxycyclohexanecarboxylate were added and well intermixed 20 parts by weight of 2,3-epoxy-2,3-dimethylbutane. A cationic photoinitiator, a tripheynyl-sulfonium hexafluorophosphate (UVE 1016 of General Electric) was then added With this mixture a coating film was prepared on a glass plate with a 20-micron doctor blade. The film was then cured with UV rays.

The UV lamp had a power of 80 watt/cm. The irradiation time was 60 seconds. The film was cured through well and exhibited a considerably improved hydrophobic surface in comparison with a composition without 2,3-epoxy-2,3-dimethylbutane.

EXAMPLE 15

An impregnating agent was prepared from 50 parts by weight of 2,3-epoxyheptadeca-methyldodecane (epoxide value 0.23) and 50 parts by weight of epoxidized oligomer mixture 1 (epoxide value 0.37). The mixture had an average epoxide value of 0.3. A polyamino imidazoline curing agent, H-active equivalent weight 93 and viscosity 0.2 Pa.2, was added to this mixture. Porous materials were impregnated with this impregnating agent and the following results were obtained:

| Material | Penetration in mm | Water Absorption After 28 Day Storage in Water (20° C.) % |
| --- | --- | --- |
| Sprucewood 12% moisture content | 0.5 | 1.2 |
| Particleboard 8% moisture content | 0.3 | 0.7 |
| Concrete Bn 250 18% moisture content | 3.2 | 0.53 |

The pot life of the impregnating agent was ca. 5 hours and the curing time was 36 hours.

EXAMPLE 16

50 parts by weight of a polymethylhydrogen-siloxane with ca. 40 SiH groups and a viscosity of 18 mm$^2$.s$^{-1}$ are mixed homogenously with 200 parts by weight of oligomer 1. Thereafter the pH is adjusted with ammonia to the slightly alkaline value of 7.5 to 8.0. Just before use, 10% of a 10% platinum catalyst (hexachloroplatinic(IV) acid hexahydrate) is added and homogeneously intermixed.

With this reaction mixture, (a) spruce wood was impregnated for hydrophobic finish and (b) silicone-treated base papers were finished abhesively.

(a) For the wood impregnation, spruce-wood blocks (15×5×5 cm) were dried in the drying chamber to a residual moisture content of 3%. 3 wood blocks were placed for 30 minutes in the above reaction mixture and then stored at room temperature for 24 hours for curing. Thereafter the impregnated wood blocks and one non-impregnated wood block were placed in a tank containing tap water (20° C.). The water absorption in % was determined at intervals of 20 hours.

| Hours | Untreated Wood H$_2$O Absorption % | Impregnated Wood H$_2$O Absorption % |
| --- | --- | --- |
| 20 | 25.5 | 6.0 |
| 40 | 28.0 | 8.5 |
| 60 | 30.0 | 10.0 |
| 80 | 31.0 | 11.0 |
| 100 | 32.0 | 13.0 |

(b) Using the same reaction mixture, release papers were also prepared by coating A thin film was applied onto a silicone-treated base paper (64 g/m$^2$) by means of a glass rod. The coating density was ca. 1.5 g/m$^2$. Cross-linking or curing was effected at +170° C. in the drying chamber. The release papers had the following values:

| Release force (FINAT No. 10): | 15–18 mN/cm |
| --- | --- |
| Residual adhesive force (FINAT No. 11): | 95–99% |
| Test adhesive strips: | TESAFILM 154 |

EXAMPLE 17

The following silicone-rubber sealing composition was prepared:

60.0 parts by weight of α,ω-dihydroxypolydimethylsiloxane 24.0 parts by weight of heptadecamethyldodecane 6.0 parts by weight of di-N-methylbenzamidomethylethoxysilane 9.7 parts by weight of silicic acide, pyrogenic, BET 150 m$^2$/g 0.3 parts by weight of dibutyl tin acetate At a relative air humidity of ca. 65%, this sealing composition has a skin-formation time of ca. 5 to 10 minutes and cures through—depending on film thickness—in 24 to 36 hours. After 14 days, the cured vulcanized product had the following values:

| Tensile strength (DIN 53 504, S 3 A): | 1.75 N/mm$^2$ |
| --- | --- |
| Elongation at break (DIN 53 504, S 3 A): | 850% |
| Shore A hardness (DIN 53 505): | 15 |

The vulcanized product exhibited the value of 0.1 in the migration test. In the migration test, the cured vulcanized product is placed in the sandwich process between two glass plates covered on the inner surface with absorbent paper, and loaded for 7 days with a 5-kg weight. The size of the outlined migration spots is measured.

EXAMPLE 18

To improve the uniform and accelerated curing of a moisture-curing, polyurethane-based expanded insulating material, the following procedure was effected:

(a) Preparation of the prepolymer 44.4 parts by weight of diphenylmethylenediisocyanate 35.6 parts by weight of polyalcohol mixture 20.0 parts by weight of trichlorotrifluoroethane (b) Polyalcohol mixture 54.0 parts by weight of polyether triol (reaction product) of triethanolamine with 17 mol of propylene oxide)

14.0 parts by weight of ethylene-oxide-based polyether diol (molecular weight ca. 1,000)

28.0 parts by weight of diisobutyl phthalate 4.0 parts by weight of 4,4,5,5,6,6,7,7,8,8-decamethylnonane Components (a) and (b) are mixed in the ratio of 1:3. The curing of the expanded insulating material was effected at 23° C. and a relative air humidity of 65%.

With an application of 0.5 mm on a cross-banded lumber veneered board, the achieved thickness, in mm, of expanded material was Insulating expanded composition without 4,4,5,5,6,6,7,7,8,8-decamethylnonane: 2.8

Insulating expanded composition with 4,4,5,5,6,6,7,7,8,8-decamethylnonane: 6.1

This synergetic effect due to the methyl-group-rich hydrocarbon was unexpected.

EXAMPLE 19

TABLE 1

Comparative test results with unmodified and modified silicone release agents

| System | SILICON/ MODIFIER* RATIO | PAPER WEIGHT g/m² | WEB VE- LOC- ITY m/Hin. | CROSS- LINKING TEMP. °C. | APPLI- CATION WEIGHT g/m² | RELEASE FORCE cN/cm | | | FORCE OF ADHESION TO STEEL cN/cm | | | DEPRESSION OF FORCE OF ADHESION % | | |
|---|---|---|---|---|---|---|---|---|---|---|---|---|---|---|
| | | | | | | a | b | c | a | b | c | a | b | c |
| SOLVENT-FREE ADDITION SYSTEM | 100:0 | 67 | 150 | 200 | 1.2 | 4 | 15 | 46 | 10 | 11 | 12 | 6 | 2 | 0 |
| | 80:20 | 67 | 200 | 190 | 1.2 | 6 | 13 | 85 | 10 | 12 | 10 | 6 | 0 | 11 |
| | 60:40 | 67 | 200 | 190 | 0.9 | 5 | 27 | 31 | 9 | 11 | 10 | 12 | 3 | 5 |
| | 40:60 | 67 | 100 | 190 | 1.4 | 3 | 10 | 2 | 10 | 10 | 11 | 5 | 8 | 2 |
| | 100:0 | 130 | 150 | 200 | 1.2 | 20 | 75 | 169 | 8 | 10 | 7 | 22 | 1 | 34 |
| | 80:20 | 130 | 150 | 200 | 0.4 | 15 | 41 | 143 | 8 | 9 | 9 | 23 | 14 | 13 |
| | 60:40 | 130 | 150 | 200 | 0.5 | 6 | 10 | 65 | 10 | 11 | 10 | 4 | 0 | 10 |
| | 40:60 | 130 | 150 | 200 | 0.3 | 7 | 28 | 75 | 9 | 9 | 9 | 10 | 19 | 11 |
| SOLVENT- CONTAINING ADDITION SYSTEM | 100:0 | 67 | 150 | 190 | 0.6 | 6 | 22 | 48 | 10 | 10 | 11 | 7 | 8 | 2 |
| | 80:20 | 67 | 150 | 190 | 0.4 | 9 | 21 | 86 | 9 | 10 | 10 | 12 | 9 | 6 |
| | 60:40 | 67 | 150 | 190 | 0.4 | 7 | 19 | 71 | 11 | 10 | 10 | 1 | 7 | 8 |
| | 40:60 | 67 | 110 | 190 | 0.4 | 6 | 16 | 45 | 9 | 9 | 11 | 16 | 15 | 2 |

\* = oligomer 1
Legend: Test adhesive tape TESAFIX 4970
a = after 1 hour/20° C./without pressure load
b = after 24 hours/70° C./with pressure load 200 N/100 cm²
c = after 7 days/70° C./with pressure load 200 N/100 cm²
Silicone-treated base papers: AV-100 Algro-Sol

What we claim is:

1. A method for rendering a substrate hydrophobic and abhesive comprising applying to said substrate a curable composition consisting essentially of at least one of

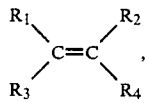  (I)

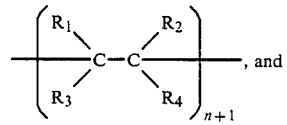  (II)

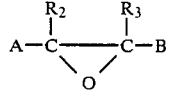  (III)

wherein $R_1$, $R_2$, $R_3$ and $R_4$ are independently hydrogen, $CH_3$, or $C_2H_5$; A and B are independently hydrogen, $CH_3$, $C_2H_5$, or of the formula (II); n is an integer between 0 and 20,000,000; and wherein each of formula (I), (II), and (III) have from 3.0 to 4.0 methyl side groups per monomer unit and curing the composition to form a coating on the substrate.

2. A method for rendering a substrate hydrophobic and abhesive comprising the steps of:
(a) applying to said substrate a curable composition comprising at least one compound of the formula

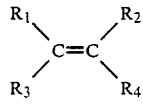  (i)

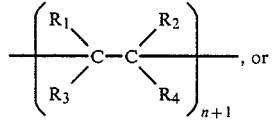

wherein $R_1$, $R_2$, and $R_3$ are each $CH_3$, $R_4$ is hydrogen, $CH_3$, or $C_2H_5$, A and B are independently hydrogen, $CH_3$, $C_2H_5$, or the formula (ii), and n is an integer between 0 to 20,000,000; and
(b) curing the composition to form a coating on the substrate.

3. The method of claim 2 wherein the composition further comprises at least one comonomer that contains a C—C double bond or a C—C triple bond.

4. The method of claim 3 wherein the comonomer is selected from the group consisting of alkenes, cycloalkenes, polyenes, allenes, arenes, arines, and compounds containing allyl, vinyl, acryl, and methacryl groups.

5. The method of claim 2 wherein the composition further comprises a compound containing a reactive hydrogen atom.

6. The method of claim 5 wherein the compound containing a reactive hydrogen atom is selected from the group consisting of amines, amides, amidoamines, imines, imides, mono- or polybasic saturated or unsaturated acids and their anyhydrides.

7. The method of claim 2 wherein the composition further comprises a polycondensable compound that contains at least one hydroxyl group.

8. The method of claim 2 wherein the composition further comprises a silicone compound.

9. The method of claim 8 wherein the silicone compound is selected from the group consisting of silanes, silanols, organosiloxanes, and organooxysilanes.

10. The method of claim 2 wherein n ranges from 50 to 1,000,000.

11. The method of claim 2, wherein n ranges from 50 to 500,000.

12. The method of claim 2, wherein the curable composition comprises the compound of formula (i).

13. The method of claim 2, wherein the curable composition comprises the compound of formula (ii).

14. The method of claim 2, wherein the curable composition comprises the compound of formula (iii).

15. The product made according to the process of claim 2.

16. The product made according to the process of claim 12.

17. The product made according to the process of claim 13.

18. The product made according to the process of claim 14.

* * * * *